United States Patent
Markel et al.

(10) Patent No.: US 7,761,493 B1
(45) Date of Patent: Jul. 20, 2010

(54) POPULATION OF SPARSE INFORMATION MODEL HIERARCHIES

(75) Inventors: Arieh Markel, Lafayette, CO (US);
Jordan Boucher, Broomfield, CO (US);
Nicholas Stephen, Grenoble (FR); Peter H. Schow, Longmont, CO (US)

(73) Assignee: Oracle America, inc., Redwood Shores, CA (US)

( * ) Notice: Subject to any disclaimer, the term of this patent is extended or adjusted under 35 U.S.C. 154(b) by 1003 days.

(21) Appl. No.: 11/279,367

(22) Filed: Apr. 11, 2006

(51) Int. Cl.
*G06F 17/00* (2006.01)

(52) U.S. Cl. ............... 707/999.1; 707/763; 707/760; 707/765; 709/223; 711/170

(58) Field of Classification Search .................. None
See application file for complete search history.

(56) References Cited

U.S. PATENT DOCUMENTS

| | | | | |
|---|---|---|---|---|
| 5,651,099 | A * | 7/1997 | Konsella | 706/13 |
| 6,963,880 | B1 * | 11/2005 | Pingte et al. | 707/103 R |
| 7,249,117 | B2 * | 7/2007 | Estes | 706/52 |
| 2003/0188293 | A1 * | 10/2003 | Boucher | 717/114 |
| 2004/0039745 | A1 * | 2/2004 | Evans et al. | 707/100 |
| 2005/0033795 | A1 * | 2/2005 | Wood | 709/200 |
| 2006/0106863 | A1 * | 5/2006 | Ramasamy Venkatraj et al. | 707/103 R |
| 2006/0242284 | A1 * | 10/2006 | Savage | 709/223 |
| 2007/0168940 | A1 * | 7/2007 | Lunawat | 717/108 |
| 2007/0240104 | A1 * | 10/2007 | Martinez et al. | 717/104 |

* cited by examiner

*Primary Examiner*—Don Wong
*Assistant Examiner*—Shyue Jiunn Hwa
(74) *Attorney, Agent, or Firm*—Marsh Fischmann & Breyfogle LLP; Jonathon A. Szumny; Kent A. Lembke

(57) ABSTRACT

A module possessing a class descriptor declares for the module the supported classes. The installation of the module triggers the examination class information model hierarchies possessed by the container on which the module is installed. Finding the established class information model hierarchies to be lacking with respect to the newly installed supported classes, a query is made to ascertain child-parent information for the newly installed supported classes. Using this information, an ancestry of each class is achieved so as to sparsely populate an information model hierarchy for each newly installed supported class.

19 Claims, 3 Drawing Sheets

POPULATION OF SPARSE INFORMATION MODEL HIERARCHIES

BACKGROUND OF THE INVENTION

1. Field of the Invention

The present invention relates, in general, to object-oriented data models in computer architecture, and, more particularly, to software, systems and methods for minimally populating object-oriented inheritance trees.

2. Relevant Background

Classification is the process by which every item in a set of items is assigned a unique class label from a predefined set of class labels. Items could be any real life entities such as documents, people, products, etc., which can be modeled as having a fixed set of attributes or features. The labels could be any meaningful abstraction for the entity being classified. For example {rich, poor} could be the set of class labels for the entity 'person'.

Many of the classification methods disclosed in published literature are for assigning class labels to a set of data items, and are not specifically designed for populating an existing concept hierarchy. Concept hierarchies can be visualized as tree structures where a child to parent relationship is fixed and well-defined. For example, 'cars' and 'trucks' are children of 'vehicle'. Generally 'IS-A' or 'A-Kind-Of' relationships are maintained, where child is a kind of parent. Each node or class (used synonymously herein) in a concept hierarchy has a label whose prefix is typically the label of its parent. Sibling classes are the set of classes at a single level of the hierarchy that have a common parent (i.e. are immediate descendants of a common ancestor node at the next level in the hierarchy). Concept hierarchies also have a special node (root-node or root-class) which is the ancestor of any node in the hierarchy.

In computer architecture, a Common Information Model (CIM) defines classes of objects containing information about different parts of an enterprise. CIM is an extensible, object-oriented data model and because it is object-oriented, CIM provides abstraction, inheritance, and dependency or association relationships between objects within the model. A CIM object is a representation or model of a managed resource such as a printer, disk drive, or CPU. An extensive discussion on CIM standards can be found at http://www.d-mtf.com. CIM makes it comparatively straightforward to track and depict the often complex interdependencies and associations among different managed objects. Such interdependencies may include those between logical network connections and underlying physical devices, or those of an e-commerce transaction and the web and database servers on which it depends.

CIM is defined to be technology and implementation-neutral, but to be useful the model must be mapped into existing repositories and accessed via established transports and interfaces. A CIM object lifecycle includes creation, modification, and deletion. The current art includes many CIM applications that spend an extraordinary amount of time reading and searching for CIM objects and associations. Some CIM classes and associations have long lifecycles while others are highly volatile. The changing nature of the CIM places a tremendous burden on computing resources to update and maintain a current and accurate CIM mapping.

Typically all CIM classes are mapped as abstract classes and subclasses as defined in the CIM schema. The result is a Directory Enabled Networking (DEN) mapping, which provides a natural hierarchy for modeling CIM inheritance and a convenient object class for searching. Once mapped, CIM objects are managed by a CIM Object Manager. When a client application accesses information about an object, the CIM Object Manager contacts either the provider for that object or the CIM Object Manager repository. The CIM Object Manager then facilitates a connection between the application and the resource the client needs to perform its operations.

Current CIM Object Managers tend to include all of the classes in an information model despite being only able to support realistically a fraction of the declared classes. Existing object managers force the supporting infrastructure to pre-populate the information model with class meta-model definitions. Furthermore, different revisions of the model require separate persistence repositories and are also pre-populated. This is a tremendous waste of resources. What is needed are systems and methods that reduce the number of represented information model classes by minimally populating an inheritance tree while still allowing inheritance-based queries.

SUMMARY OF THE INVENTION

Briefly stated, the present invention involves methods and systems for sparsely populating information model hierarchies. A module possessing a class descriptor declares, for that module, supported classes. The installation of the module to a container triggers the examination of class information model hierarchies possessed by the container. Finding the established class information model hierarchies to be lacking with respect to the newly installed supported classes, a query is made to ascertain child-parent information for the newly installed supported classes. Using this information, an ancestry of each class is achieved so as to sparsely populate an information model hierarchy for each newly installed supported class without having to populate the entire information model.

The foregoing and other features, utilities and advantages of the invention will be apparent from the following more particular description of an embodiment of the invention as illustrated in the accompanying drawings.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

The present invention describes methods and systems for sparsely populating information model hierarchies. Information models and model managers are utilized to describe and simplify the often complex relationships that exist between the multitude of objects, files, devices, etc. that exist in a typical computing environment.

A class information model (also referred to as a Common Information Model (CIM)) is a set of objects having similar properties and fulfilling similar purposes. In a database management schema, for example, individual classes might define such things as files, users, tables, hardware, etc. Classes also follow a hierarchical structure wherein each class can have both subclasses and parent classes, also referred to as super-classes or generalization classes. The broadest parent class of a subclass is referred to as a root-class. A subclass inherits properties of its super-class and all properties and methods of a super-class apply to the subclass.

A developer uses the CIM to create/identify classes that represent elements within a certain management domain (e.g. hard drives, applications, network routers, or user defined technologies such as a networked air-conditioning system). By viewing and making changes to a CIM class instance a manager or developer can control different aspects of an enterprise. By declaring those classes that a particular application will support, the developer relies on the infrastructure on which the application is deployed (the container) to possess and maintain an accurate and current information model. Traditionally this is done by maintaining a complete CIM comprising every child and branch (class and subclass) regardless of what actual class the application actually supports.

Figure 1:
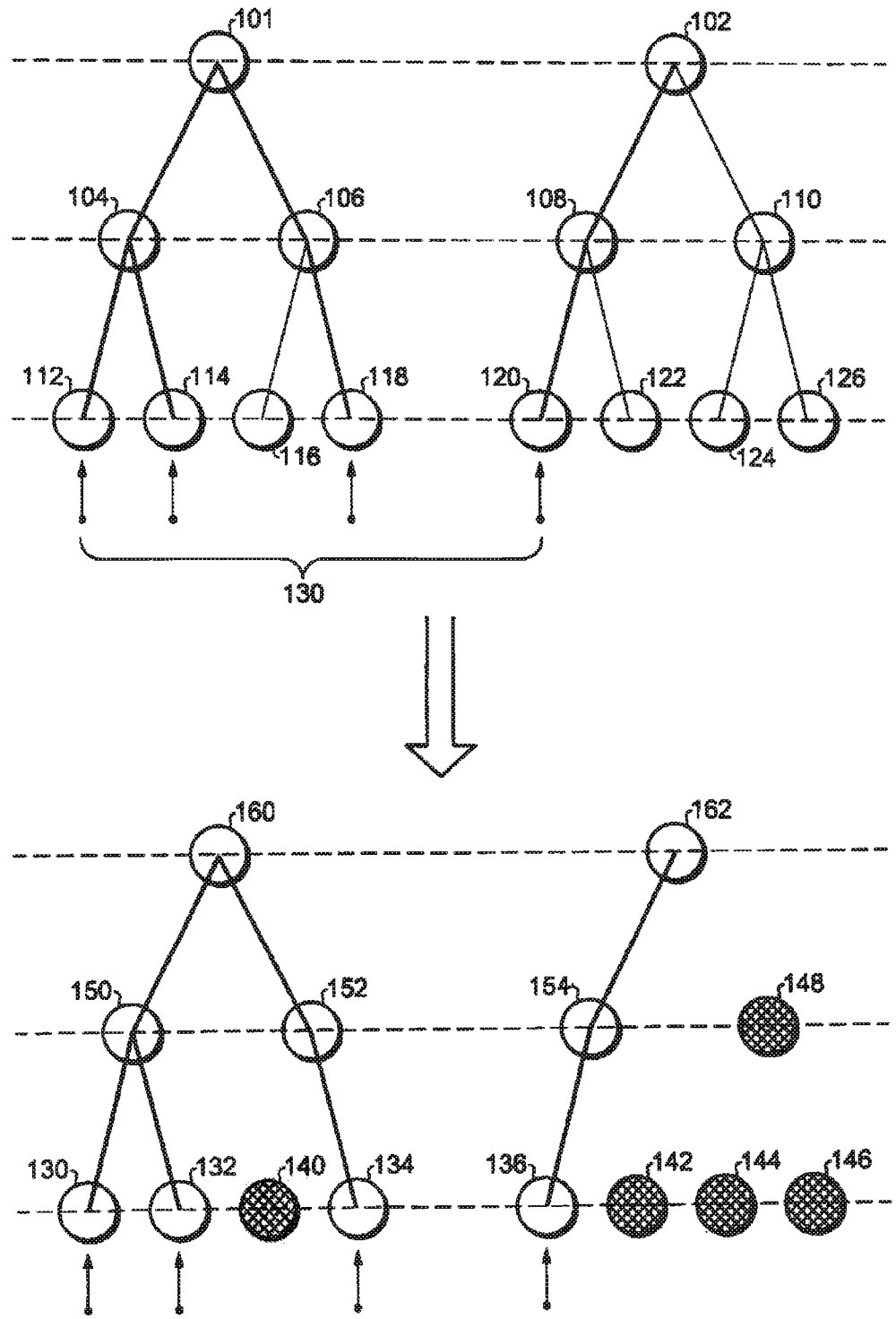
FIG. 1 shows a high level hierarchal diagram of a common information model according to one embodiment of the present invention.

FIG. 1 shows a simplified CIM mapping of an object-oriented class structure. Each tree comprises seven nodes orientated with the super-class nodes 101, 102 at the top of the page. Each subsequent level of subclass (shown by the dashed lines) represents an increased level of class specificity. While level two subclass nodes 104, 106, 108, 110 possess added specificity, they retain the properties of the super-class 101, 102. For example, if one super-class node 101 represented animals, level two nodes 104, 106 may represent mammals and reptiles respectively. In the same light, the next level under mammals 104 may represent dogs 112 and cats 114 and corresponding subclasses of reptiles. While possessing increased specificity, the cat class model still retains its character as an animal class.

Applications rarely support all of the classes of any CIM. During development, application developers define what classes the application will support, ignoring other classes that may be present in a CIM. Applications possess a manifest or declaration that lists certain classes 130 that it will interact with during execution. The object manager accesses the CIM to facilitate this execution. While knowledge of the class/parent relationship of the supported classes is an execution necessity, the maintenance of the remaining CIM for non-supported objects is a waste of infrastructure resources. As previously described, the prior art requires the entire CIM to be maintained even though an application may only declare that it only supports a minority of the subclasses. For example, a small animal veterinarian specializing in dogs and cats may have a computer application specifically applicable to his/her medical practice of small animals. The program needs only to access data files for dogs or cats however an animal kingdom based CIM supported by the computer's operating system may possess nodes for multitudes of classes and subclasses that are never applicable to the applications needs. For example and as shown in FIG. 1, such an installed application declares upon its installation that will support four 130 object classes 112, 114, 118, 120. The remaining four subclass nodes 116, 122, 124, 126 are irrelevant to the execution of this particular application yet the maintenance of their particular parent/child relationship is ongoing and a waste of resources.

In one embodiment of the present invention, a CIM of supported classes is uniquely generated from the subclass definition to, when necessary, the super-class. Rather than having to maintain a CIM of the entire hierarchal model to ensure that an application can properly access a declared class, only the specific parent/child relationship (and its corresponding ancestry) of the declared classes are created and maintained. By generating the model from the child to the parent rather than from the parent to the child, the present invention frees valuable resources.

Continuing with the example depicted in FIG. 1, a CIM for the declared supported classes 130 is built starting with the subclass nodes 130, 132, 134, 136. Note that the CIM created does not include unsupported subclass nodes or their parents 140, 142, 144, 146, 148 and recall that each subclass implicitly defines its parent. In the example illustrated in FIG. 1, the supported subclasses 130, 132, 134, 136 define their parents 150, 152, 154. In turn, each parent of each subclass is itself a child and therefore defines its own parent. The hierarchy model creation continues until a root-class or super-class parent 160, 162 is identified. In one embodiment of the present invention, the implicitly created parent 150, 152, 154 of each subclass 130, 132, 134, 136 is artificially designated as the root-class of the subclass. When the actual parent is later identified, the artificial root-class designation is replaced by its actual parent. The newly found parent can then be again artificially designated as the root-class for the now two subclasses stemming from the parent. This process of artificially designating the implicitly defined parent as a root-class node continues until a CIM unique to the supported class is constructed.

In another embodiment of the present invention, the application supporting the declared subclasses may not need to define the ancestry of the subclass beyond a certain point. In such a situation, the CIM for the subclass may be incomplete from the perspective of determining the actual root-class yet completely capable of supporting the needs of the application. Accordingly, resources that would otherwise be used to maintain the complete CIM may be released.

Figure 2:
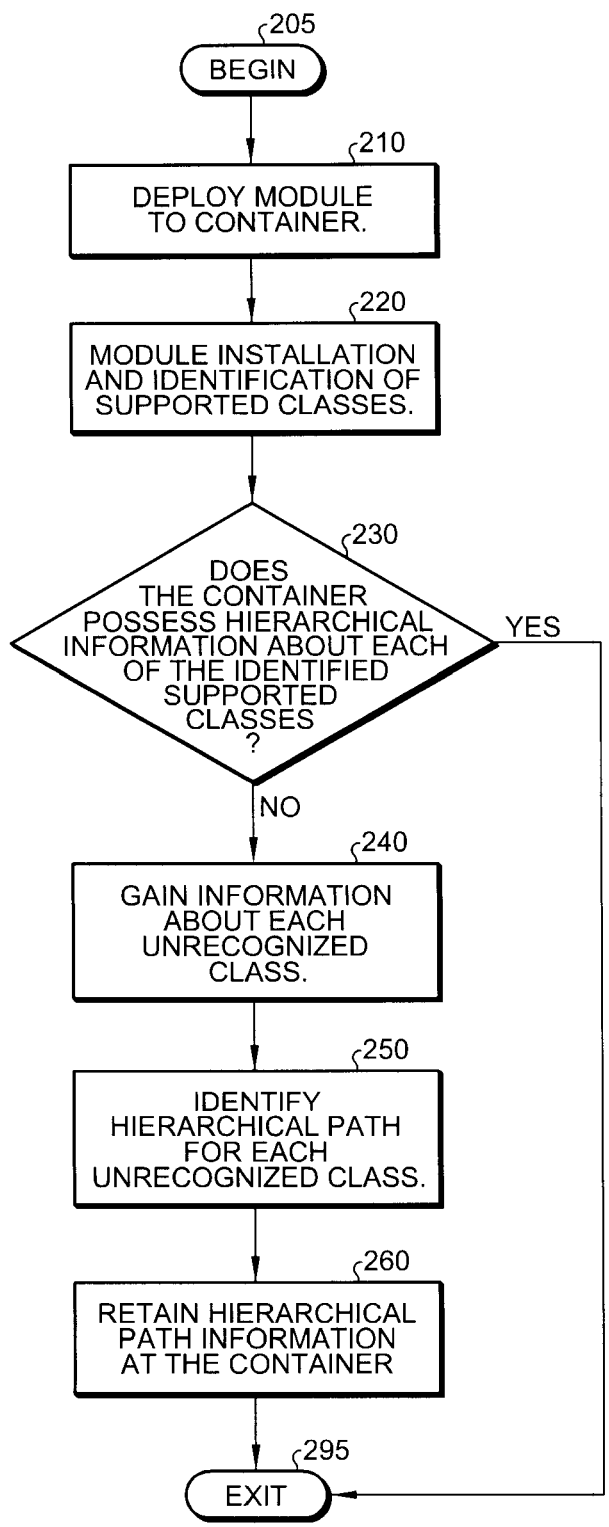
FIG. 2 shows a method embodiment according to the present invention for sparsely populating an information model hierarchy.

FIG. 2 depicts a flow diagram of one method embodiment according to the present invention for sparsely populating an information model hierarchy. An application module that originates from a developer is deployed 210 to a container. A container is an application program or subsystem in which the program building block, known as a component or module, is run. For example, a component—such as a button or other graphical user interface or a small calculator or database requestor—can be developed using JavaBeans™ that can run in Netscape® containers such as browsers.

The installation of the module 220 triggers the module to identify to the container classes supported by the module. In other embodiments of the present invention triggering of the module to identify the container classes supported by the module includes a first access of the module or a first query of the supported classes. Other triggering events include but are not limited to manually triggering the generation of a sparse hierarchy model as may occur during troubleshooting or diagnostic processes. Likewise triggering may occur upon the installation of a software patch to the module that may affect the information model itself. Another triggering event may be changes in connectivity of the network that may be representative of a change in the run-time environment.

Once the supported classes are identified to the container, a query is run to determine whether the container possess 230 a CIM that includes the module's declared classes. When the response to the query is yes, the module is poised for execution. When the response is no, information concerning the declared supported classes is obtained 240 from a class definition repository. The class definition repository provides the container with enough information regarding the declared class so as to identify 250 the ancestral parent for each of the supported classes and then, according to one of the embodiments of the present invention, retains 260 the ancestral information for future use.

Continuing with the previous example, assume that the installed module declares support of the object class for golden retrievers. Upon a query of the container, it is determined that the container does not possess a current hierarchal model for the newly supported class of golden retrievers. In one embodiment of the present invention, a sparse information model builder queries a class information repository to ascertain data regarding the subclass of golden retrievers. This data will implicitly include parent information about the requested class, i.e. golden retrievers. In this case, the implicit parent may be retrievers of which golden retrievers is a subclass. According to one embodiment of the present invention, the parent class, retrievers, is artificially designated as the root-class. The designation is artificial since there is certainly a parent to the retriever class such as dog, which may have the parent of mammal, which may, in turn, have the parent of animal and so forth. The module which supports the class golden retriever may not be interested in any information beyond the level of retriever thus maintaining a CIM containing class information for each mammal and animal is a waste of resources. Accordingly, the population of the class ancestry may end with only one or two nodes. Similarly, the container does not have to possess, at least for this module, any class hierarchical information regarding bull dogs, cats, horses, people, and other irrelevant classes.

The process described above is reflected in the pseudo-code presented below.

```
>     // Initial state: parent was 'implicitly' created - 'parent' was
>     //         'artificially' set to ROOT_CLASS
>     //
>     // new ModelClass( animal, dog ); // dog never seen before
>     //
>     // CIM_Object <-- animal <-- dog
>     //
>
>     // If 'parent' is defined 'later', then its 'artificial' parent
>     // needs to be altered
>     //
>     // new ModelClass( dog, retriever); // dog now defined - alter
>     // parent
>     //
>     // retriever.setParent( dog );
>     //
>     // CIM_Object <-- animal <-- dog <-- retriever
>     //
>     //
> /** interface definition for a class in the Information Model
> *
> */
>     public interface ModelClass
> {
>
>     /** get the class name
```

```
>     *
>     * @return the name of the class
>     */
>     public String getClassName( );
>
>
>     /** get the Original class name (no toLower( )/toUpper( ))
>     *
>     * @return the name of the class
>     */
>     public String getOrigClassName( );
>
>
>     /** get the version for this class
>     *
>     * @return a String with the version
>     */
>     public String getClassVersion( );
>
>
>     /** get the parent's class name
>     *
>     * @return the super class name
>     */
>     public ModelClass getParentClass( );
>     /** get the child subclasses
>     *
>     * @return a Collection with the child subclasses
>     */
>     public Collection<ModelClass> getSubclasses( );
>
>
>     /** get the child subclasses names
>     *
>     * @return a Collection with the child subclass names
>     */
>     public Collection<String> getSubclassNames( );
>
>
>     /** method to make the class an orphan (clear its parent)
>     */
>     public void orphan( );
>
>
>     /** method for classes to add subclasses
>     *
>     * @param theChild       the child subclass
>     */
>     public void addSubclass( ModelClass theChild );
>
>
>     /** method for classes to remove subclasses
>     *
>     * @param theChild       the child subclass
>     */
>     public ModelClass removeSubclass( String theChild );
>
>
>     /** method for classes to remove subclasses
>     *
>     * @param theChild       the child subclass
>     */
>     public ModelClass removeSubclass( ModelClass theChild ); }
```

The above reference code further describes a process whereby a parent or super-class query returns all of the child subclasses associated with that parent. As previously mentioned, maintaining all of the subclasses when only one or a few of the subclasses are supported by installed modules is inefficient. According to one embodiment of the invention, the subclasses that are not supported by the installed modules are removed from the model hierarchy. The result is a sparsely populated inheritance model that frees valuable computing resources. While the invention has been particularly shown and described with reference to one or more embodiments, it will be understood by those skilled in the art that various other changes in the form and details may be made without departing from the spirit and scope of the invention.

To further illustrate the present invention consider the following, more computer relevant example. Assume a module has been deployed to a container having the following module descriptor.

```
<module-descriptor assettype="Foo_System">
    <concrete-class-list>
        Foo_System,
        Foo_SoftwarePackage,
        Foo-InstalledSoftarePackage,
        Foo_NetworkController,
        Foo_DiskDrive
    </concrete-class-list>
```

During the installation process, the module descriptor contributes the following class definitions.

Foo_System:
Foo_System extends CIM_UnitaryComptuerSystem
Foo_SoftwarePackage:
Foo_SoftwarePackage extends CIM_SoftwareIdentity
Foo_InstalledSoftwarePackage:
Foo_InstalledSoftwarePackage extends CIM IntalledSoftwareIdentity
Foo_NetworkController:
Foo_NetworkController extends CIM_NetworkController
Foo_DiskDrive:
Foo_DiskDrive extends CIM_DiskDrive In addition to the class definitions contributed by the module, class definitions are also contributed by basic Schema.

CIM_UnitaryComputerSystem:
CIM_UnitaryComputerSystem extends CIM_ComputerSystem
CIM_ComputerSystem:
CIM_ComputerSystem extends
    (wherein Computer System is the Root-class)

The deployment of the module to the container triggers an event to gain the concrete classes from the module descriptor and sparsely populate the resulting inheritance tree.

```
Obtain the list of 'concrete' classes
loop:
    for each class
        handle-class:
            un-marshal meta-model for the class
            obtain the name of the super-class
            if does not exist in tree
                handle-class
            if class has parent
                insert class as child of super-class
            else
                insert class at root (add to root list)
        loop ...
```

The resulting sparsely populated inheritance tree takes the form:

```
CIM_Object (virtual root)
    |
    ...
    CTM_System
    |
    CIM_UnitaryComptuerSystem
```

-continued

```
        |
        Foo_System
    ...
    CIM_SoftwareIdentity
        |
        Foo_SoftwarePackage
    ...
    CIM_InstalledSoftwareIdentity
        |
        Foo_InstalledSoftwarePackage
    ...
    CIM_DiskDrive
        |
        Foo_DiskDrive
    ...
    CIM_NetworkController
        |
        Foo_NetworkController
```

Figure 3:
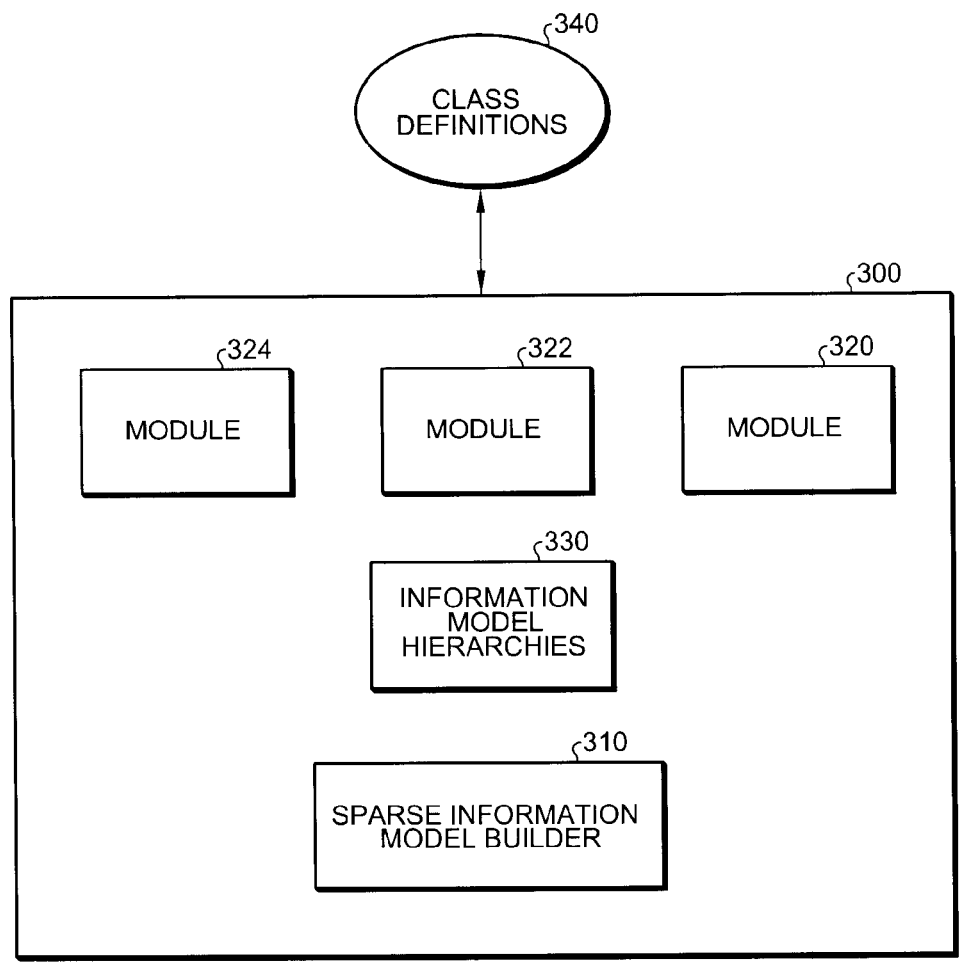
FIG. 3 is a high level block diagram of the relationship between a system for sparsely populating a class information hierarchy and the container on which it operates according to one embodiment of the present invention.

FIG. 3 is a high level block diagram of a system consistent with the method described above for sparsely populating a class information hierarchy according to one embodiment of the present invention. A container 300 is shown in FIG. 3 having three installed modules 320, 322, 324. Each module declares to the container upon their respective installation a list of supported classes. A sparse information model builder 310 is triggered by the installation and declaration process to determine whether the supported classes are presently maintained in the container's repository of information model hierarchies 330. Upon learning that the classes supported by the modules are not present in the information model hierarchy 330, the information model builder 310 communicates with a class definition repository 340 to gain basic information about the declared classes. Using this information, the sparse information model builder 310 populates a sparse information model for each supported class as described herein.

While FIG. 3 depicts the sparse information model builder 310 located within a container, the present invention can equally be implemented apart from the container on which the modules are installed. Indeed, the container 300, modules 320, 322, 324, class definitions 340, and the sparse information model builder 310 can be distributed throughout a network of nodes such as in a distributed computing environment, an intranet or the Internet. In another embodiment of the present invention, the sparse information model builder 310 and its functionalities are located on a server whereby various clients can access the ability to sparsely populate information models as a service and not have to internally support the operation of the sparse information model builder 310 itself.

Similarly, it should be noted that the concepts presented herein with respect to the present invention are platform and operating system independent. The present invention is equally applicable to any system that uses object-oriented class models and represents their interrelationships with an hierarchical information model.

Figure 4:
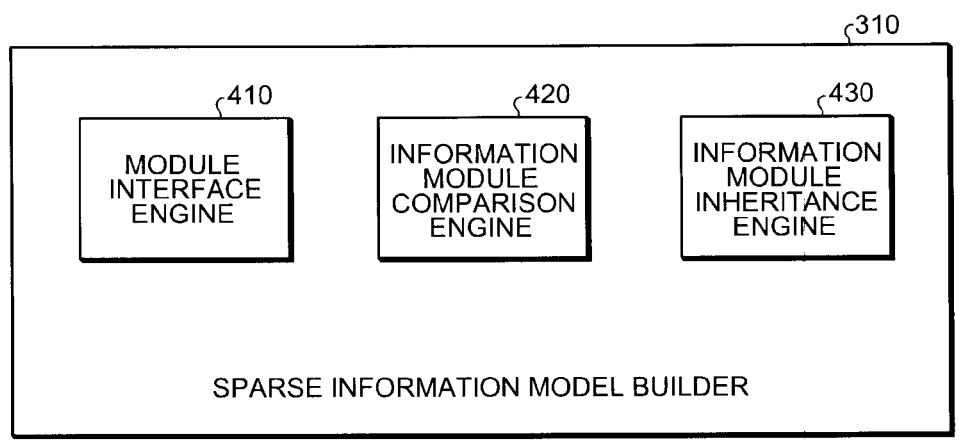
FIG. 4 is a block diagram, according to one embodiment of the present invention, of a system for sparsely populating an information model hierarchy.

Finally, FIG. 4 is a block diagram of a system for sparsely populating an information model hierarchy according to one embodiment of the present invention. According to one embodiment of the present invention, the sparse information model builder 310 comprises a module interface engine 410, an information model comparison engine 420, and an information model inheritance engine 430. Upon the installation of a module to a container, the module interface engine 410 is triggered to ascertain the module's supported classes. Once a list of supported classes is ascertained, the information model comparison engine 420 examines information models presently maintained by the container to determine whether newly supported classes are included. When the information model comparison engine 420 determines that the newly supported classes are not included in the present information models, the information model inheritance engine 430 interfaces with a class definition repository and sparsely populates the newly supported classes. Once populated, the newly created information model is maintained by the container.

As will be understood by those familiar with the art, the invention may be embodied in other specific forms without departing from the spirit or essential characteristics thereof. Likewise, the particular naming and division of the modules, managers, functions, systems, engines, layers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, functions, systems, engines, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

Although these claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

We claim:

1. A computer implemented method for sparse population of an object-oriented information model hierarchy in a run-time environment, the method comprising:
   on a computer system, installing an application module on the run-time environment, wherein the module comprises a list of classes supported by the module;
   determining with a module interface engine on the computer system whether the run-time environment on which the module is installed possesses hierarchical information about each class in the list of classes supported by the module;
   responsive to determining with a model comparison engine on the computer system that the run-time environment lacks hierarchical information about at least one class supported by the module, querying with a model inheritance engine on the computer system a class definition repository for hierarchal class information for the at least one class;
   determining with the model inheritance engine an ancestral history for each of the classes not currently supported by the run-time environment using the hierarchical class information; and
   maintaining on the run-time environment of the computer system the ancestral history; wherein only ancestral history for supported classes is maintained in the object-oriented information model hierarchy.

2. The computer implemented method of claim 1 wherein the ancestral history for each class not supported by the run-time environment further comprises an inheritance relationship between the class and its super-class populated only with subclasses supported by the application module.

3. The computer implemented method of claim 1 wherein determining the ancestral history for each class comprises artificially designating an implicitly created parent as a root-class parent.

4. The computer implemented method of claim 3 wherein the artificially designated root-class parent is replaced with a parent defined by the object-oriented information model hierarchy.

5. The computer implemented method of claim 1 wherein determining whether the run-time environment on which the module is installed possesses hierarchical information about each class of the list of classes supported by the module is triggered by module installation.

6. The computer implemented method of claim 1 wherein determining whether the run-time environment on which the module is installed possesses hierarchical information about each class of the list of classes supported by the module is triggered by first access of the installed module.

7. A computer system for sparse population of an object-oriented information model hierarchy in a run-time system, the system comprising:
   an application module that supports at least one model class, wherein the at least one model class comprises an implicitly created parent; and
   a sparse information model builder configured to communicate with a class definition repository to gain information about the implicitly created parent of the at least one model class and to identify a super-class of the at least one model class;
   wherein the sparse information model builder is configured to:
      create an artificial root-class designation of the implicitly created parent of the at least one model class;
      replace the artificial root-class designation of the implicitly created parent with
      an artificial root-class designation of an actual parent; and
      form an inheritance relationship between the at least one model class and the super-class populated only with subclasses supported by the application module.

8. The system of claim 7 wherein the inheritance relationship comprises only paths terminating at supported classes.

9. The system of claim 7 wherein identification of the at least one model class supported by the application module is triggered by installation of the application module into the run-time system.

10. The system of claim 7 wherein identification of the at least one model class supported by the application module is triggered by first access of the application module.

11. The system of claim 7, wherein the artificial root-class designation of the actual parent is for the at least one model class and for the implicitly created parent.

12. The system of claim 7, wherein the inheritance relationship of the at least one model class is unique to the at least one model class.

13. A system for sparse population of an object-oriented class hierarchy model, the system comprising:
   a computer system;
   a model class on the computer system supported by an application module having an implicitly created parent;
   a class definition repository on the computer system; and
   a hierarchal class information model builder on the computer system in communication with the class definition repository, wherein the hierarchal class information model builder creates an artificial root-class designation of the implicitly created parent of the supported model class to form an inheritance relationship between a class and its super-class populated only with subclasses supported by the application module.

14. The system of claim 13 wherein the supported model class is identified by the installed application module.

15. The system of claim 13 wherein the supported model class is identified by a first access of the installed application module.

16. The system of claim 13 wherein the artificial root-class designation is altered to reflect defined parent-child relationships.

17. The system of claim 13 wherein the hierarchal class information model builder removes child subclasses from the object-oriented class hierarchy model when they are not supported by the installed application module.

18. The system of claim 13 further comprising a run-time environment on which a module declaring the supported model class is installed.

19. The system of claim 13 further comprising a computer network having at least one client and at least one server wherein the hierarchal class information model builder resides on the server, wherein the server is capable of building sparse population hierarchal class information models based on client subscription requests.

* * * * *